US005180524A

United States Patent [19]

Casilli et al.

[11] Patent Number: 5,180,524

[45] Date of Patent: Jan. 19, 1993

[54] PHOTOCHROMATIC COMPOSITION AND PHOTOCHROMATIC ARTICLES WHICH CONTAIN IT

[75] Inventors: Nicola Casilli, Ravenna; Luciana Crisci, Sant'Angelo Lodigiano; Fiorenzo Renzi, Gorgonzola; Franco Rivetti, Schio, all of Italy

[73] Assignee: Enichem Synthesis S.p.A., Palermo, Italy

[21] Appl. No.: 650,035

[22] Filed: Feb. 4, 1991

Related U.S. Application Data

[63] Continuation of Ser. No. 264,818, Oct. 31, 1988, abandoned.

[30] Foreign Application Priority Data

Nov. 5, 1987 [IT] Italy .............................. 22528 A/87

[51] Int. Cl.[5] .......................... G02B 5/23; F21V 9/04

[52] U.S. Cl. .................................... 252/586; 252/589

[58] Field of Search ........................ 252/582, 589, 586

[56] References Cited

U.S. PATENT DOCUMENTS 4,342,668 8/1982 Hovey et al. ...................... 252/586

FOREIGN PATENT DOCUMENTS 195898 10/1986 European Pat. Off. .
245020 11/1987 European Pat. Off. .

*Primary Examiner*—Robert L. Stoll
*Assistant Examiner*—Philip Tucker
*Attorney, Agent, or Firm*—Hedman, Gibson & Costigan

[57] ABSTRACT

A photochromatic composition contains at least two photochromatic compounds, defined by the general formula:

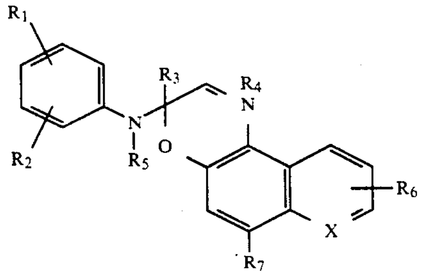

wherein the various substituents from $R_1$ to $R_7$ and X are as defined in the specification.

In such a mixture, at least one photochromatic compound is defined by the general formula, wherein $R_7$ represents a hydrogen atom, and at least one further compound is also defined by the general formula, wherein $R_7$ represents an $-NR_8R_9$, with $R_8$ and $R_9$ having the meaning as defined in the text.

13 Claims, 5 Drawing Sheets

PHOTOCHROMATIC COMPOSITION AND PHOTOCHROMATIC ARTICLES WHICH CONTAIN IT

This is a continuation of application Ser. No. 07/264,818, filed Oct. 31, 1988 now abandoned.

The present invention relates to a photochromatic composition which contains at least two organic photochromatic compounds.

The photochromatic compounds are substances which display the characteristics of reversibly changing in colour and/or degree of light transmission when they are exposed to some types of electromagnetic radiation, and to sun light, turning back into their original colour and transmission status when the initial light source is removed.

The substances endowed with photochromatic characteristics known from the prior art are many, and belong to several classes of both inorganic and organic compounds, as described, e.g., in "Photochromism", G. H. Brown (Ed.), Vol. IV, from the Weisseberger Series "Techniques of Organic Chemistry", Wiley-Interscience, New York (1971).

Among the organic photochromatic compounds, in particular those belonging to the class of the spiro-indolino-naphtho-oxazines are known, which are capable of conferring photochromatic characteristics on polymerized and transparent organic materials (organic glasses), for their use as sun filters and photochromatic optical articles, such as disclosed, e.g., in the following patents: U.S. Pat. Nos. 3,562,172; 3,578,602; 4,215,010; 4,342,668; EP 146 135, WO 85/02619; EP 245 020; and in European patent applications publ. Nos. 134,633 and 141,407.

The known photochromatic compounds belonging to the class of the spiro-indolino-naphtho-oxazines exhibit, as compared to other known organic photochromatic compounds (e.g., those belonging to the class of the spiro-piranes) the advantage of having a much higher fatigue strength, when they are submitted to repeated cycles of colouring and de-colouring; and a much higher ageing resistance when they are exposed to sun light, or to artificial ageing tests. This behaviour is very advantageous for the above set out uses.

However, the organic photochromatic compounds known from the prior art are practically colourless in their deactivated status, both in solution in common organic solvents, as well as when they are incorporated in transparent polymeric materials, and turn to a generally blue colour when they are activated. This blue colour is a disadvantage for their use as optical photochromatic articles, in particular in the ophthalmic sector, for which more neutral colours please, e.g., the gray colour.

Furthermore, the photochromatic effect obtained is in many cases of low intensity as regards the change in transmittance in the visible wavelength range. In other cases, such a change, although is satisfactory at low temperatures, is depressed down to unacceptedly low values with increasing temperature, even if within the values as required in practical use. Finally, the activation of the spiro-indolino-naphtho-oxazines, obtained under controlled laboratory conditions by irradiation with UV light of several wavelengths from about 320 to about 380 nm, is often not reproduced with the same satisfactory intensity when the exposure is carried out to the spectrum of frequencies and of relative intensities of sun light, as required for the ophthalmic use, and as sun filter.

The purpose of present invention is overcoming the drawbacks which affect the prior art by means of a novel photochromatic composition containing at least two photochromatic compounds belonging to the class of the spiro-indolino-naphtho-oxazines.

In accordance therewith, the present invention relates to a photochromatic composition consisting of at least two photochromatic compounds, both of which can be represented by the following general formula (I):

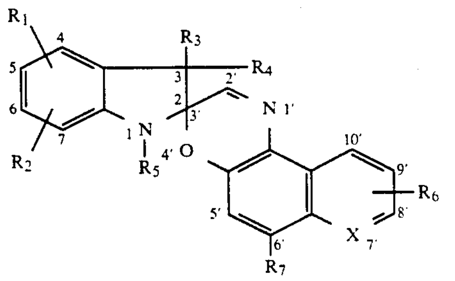

(I)

wherein:

$R_1$ and $R_2$ independently represent a hydrogen atom or a halogen atom (chlorine, bromine or fluorine), or a group selected from: $(C_1-C_5)$-alkoxy; nitro; cyano; and a linear or branched $(C_1-C_5)$-alkyl either unsubstituted or substituted with one or more halogen (chlorine, bromine and fluorine) atoms, or $(C_1-C_5)$-alkoxy, $(C_1-C_5)$-alkyl-thio, $(C_1-C_5)$-carboxy-alkyl and cyano groups; or $R_1$ and $R_2$, when are not hydrogen, can be linked to any of the 4-, 5-, 6- and 7-positions of the indolinic moiety;

$R_3$ and $R_4$ independently represent linear or branched $(C_1-C_5)$-alkyl group, phenyl or benzyl; or $R_3$ and $R_4$, when considered jointly together with the carbon atom to which they are linked, form a $(C_5-C_8)$-cycloalkyl group;

$R_5$ is a phenyl; benzyl; allyl group; or a linear or branched $(C_1-C_5)$-alkyl group, either unsubstituted or substituted with one or more halogen (chlorine, bromine and fluorine) atoms, or $(C_1-C_5)$-alkoxy, $(C_1-C_5)$-alkyl-thio, $(C_1-C_5)$-carboxy-alkyl and cyano groups;

$R_6$ represents a hydrogen atom, a halogen (chlorine, bromine or fluorine) atom, or a group selected from $(C_1-C_5)$-alkoxy, $(C_1-C_5)$-alkyl-thio, $(C_1-C_5)$-carboxy-allyl and cyano groups; and a linear or branched $(C_1-C_5)$-alkyl group, either unsubstituted or substituted with one or more halogen (chlorine, bromine and fluorine) atoms, or $(C_1-C_5)$-alkoxy, $(C_1-C_5)$-alkyl-thio, $(C_1-C_5)$-carboxy-alkyl and cyano groups; or represents a condensed aromatic or heterocyclic ring;

$R_6$, when it does not represent hydrogen, or a condensed aromatic or heterocyclic ring, can be in any one of the 7'-, 8'-, 9'-, 10'-positions of the naphthenic moiety;

$R_7$ represents either a hydrogen atom, or an

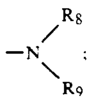 ; and $R_8$ and $R_9$ represent, independently from each other, a hydrogen atom, or a linear or branched $(C_1-C_5)$-alkyl group, phenyl or benzyl; or $R_8$ and $R_9$, when considered jointly together with the nitrogen atom to which they are linked, form a mono-cyclic or poly-cyclic structure, of from 5 to 12 members, possibly containing a further hetero-atom selected from between oxygen and nitrogen; and X represents either —CH— or N;

in which composition at least one of the photochromatic compounds having formula (I) is characterized in that it has the $R_7$ substituent constituted by hydrogen, and at least one of the photochromatic compounds having formula (I) is characterized in that it has the $R_7$ substituent constituted by a group

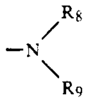

wherein $R_8$ and $R_9$ have the above seen meanings.

In the preferred form of practical embodiment, the photochromatic compounds of the composition according to the present invention, all of which can be defined by means of the general formula (I), and with the proviso that in at least one of them the $R_7$ substituent represents a hydrogen atom and in at least one of them the $R_7$ substituent represents the amino group

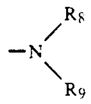

the $R_1$, $R_2$, $R_3$, $R_4$, $R_5$, $R_6$, $R_7$, and, if present, $R_8$ and $R_9$, substituents, have the following meaning:

$R_1$ and $R_2$ independently represent the hydrogen atom, or the methyl, methoxy or halogen groups;

$R_3$ and $R_4$ represent each the methyl or ethyl group, or, when considered jointly, represent the cyclohexyl group;

$R_5$ represents a $(C_1-C_5)$-alkyl group;

$R_6$ represents the hydrogen atom or the methoxy group;

$R_8$ and $R_9$ jointly represent, together with the nitrogen atom to which they are linked, the piperidino, morpholino, pyrrolidinyl or hexamethyleneimino group; and X represents either —CH— or N.

Furthermore, still in the preferred form of practical embodiment, the $R_1$, $R_2$ and $R_6$ groups, when they do not represent hydrogen, or, in case of $R_6$ group, a ring structure, are respectively linked to the (4,5)- or (5,6)- and 9'-positions of the molecule.

Specific examples of photochromatic compounds in which the $R_7$ substituent is different from hydrogen, are:

A) 1,3,3-Trimethyl-6'-piperidino-spiro-[indolino-2,3'-(3H)-naphtho-(2,1-b)-(1,4)-oxazine].

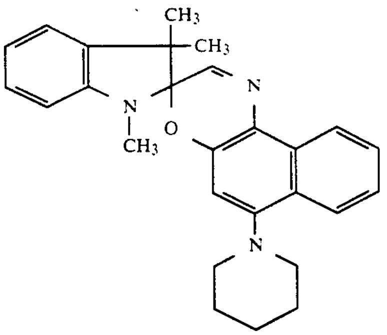

B) 1,3,3-trimethyl-6'-morpholino-spiro[indolino-2,3'-(3H)-naphtho-(2,1-b)-(1,4)-oxazine].

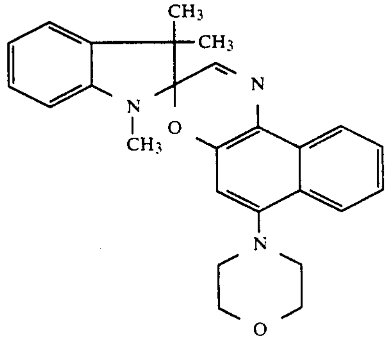

C) 1,3,3,4,5,-(or 1,3,3,5,6)-pentamethyl-6'-piperidino-spiro-[indolino-2,3'-(3H)-naphtho-(2,1-b)-(1,4)-oxazine].

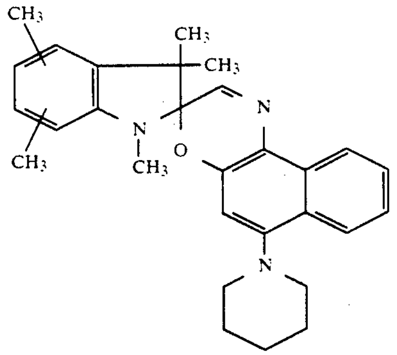

D) 1,3,3-trimethyl-6'-piperidino-9'-methoxy-spiro-[indolino-2,3'-(3H)-naphtho-(2,1-b)-(1,4)-oxazine].

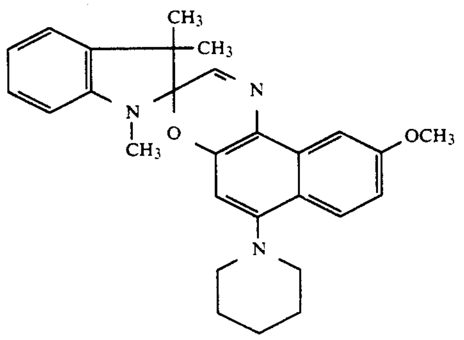

Specific examples of photochromatic compounds in which the $R_7$ substituent is hydrogen are:

E) 1,3,3,4,5- (or 1,3,3,5,6) pentamethyl-spiro-[indolino-2,3'-(3H)-naphtho-(2,1-b)-(1,4)-oxazine].

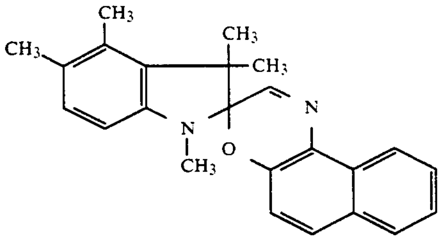

F) 1,3,3-trimethyl-spiro-[indolino-2,3'-(3H)-naphtho-(2,1-b)-(1,4)-oxazine].

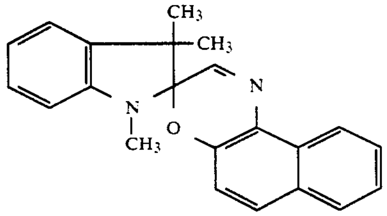

G) 1,3,3-trimethyl-9'-methoxy-spiro-[indolino-2,3'-(3H)-naphtho-(2,1-b)-(1,4)-oxazine].

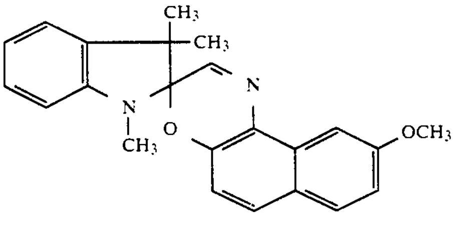

The above listed photochromatic compounds have been incorporated into transparent organic polymers by means of techniques depending on the polymer used.

In the photochromatic mixture of the present invention, the simultaneous presence of a photochromatic compound definable by means of formula (I) and having an $-NR_8R_9$ in the 6'-position of the molecule, and of a photochromatic compound definable by means of said formula, but in which the substituent in 6'-position is hydrogen atom, is advantageous.

In such a mixture, as said, both compounds act with a synergistic effect on the regulation of the sun light, generating a more intense colour, and with shorter response times, than the normal photochromatic organic compounds of the prior art, as well as than the individual components of the same mixture.

The change in transmittance is furthermore maintained at satisfactory values with increasing room temperature, and much higher than as required by the practical application. Furthermore, the shades of colour which can be obtained by means of the use of the photochromatic mixture of the present invention are more neutral than the blue colour generally shown by individual components, and can be modulated within a wide range by means of a properly balanced dosage of both basic components, as well as of other components known from the prior art.

Advantageously, this mutual mol ratio of the two photochromatic components defined by the general formula (I) and respectively bearing the $-NR_8R_9$ group and hydrogen in the 6'-position, is a number comprised within the range of from 0.1 and 9 and preferably from 0.2 to 1.5.

As said, the photochromatic mixture of the present invention can be constituted by more than two compounds as defined by the general formula (I), provided that at least two of them are different from each other as to the 6'-substituent, as above said.

Said mixtures can furthermore additionally contain other components, such as the U.V. stabilizers known from the prior art, capable of improving the duration of the photochromatic effect, without impairing the intensity of photocolourability of the same mixtures. Non-limitative examples of U.V.-stabilizers for the purposes of the present invention are the hindered ammines (HALS).

The photochromatic mixture according to the present invention is useful in the production of photochromatic articles endowed with particular colour transitions, a high activation by exposure to sun light, a high fatigue and ageing resistance.

The photochromatic mixture according to the present invention is applied to the surface of, or is incorporated into, the desired articles, generally constituted by transparent polymeric materials, by means of suitable techniques. Photochromatic polymeric articles can be obtained by means of moulding techniques (e.g., injection-moulding, press-moulding, and so forth;) by homogeneously dispersing throughout the mass the photochromatic mixture.

According to an alternative route, the mixture can be dissolved in a suitable solvent, together with a polymeric material (e.g., poly-methyl-methacrylate, polyvinyl-alcohol. poly-vinyl-butyral, cellulose acetate-butyrate or epoxy resin, polysiloxane resin or urethane resin, and so forth), and deposited on a transparent support in order to form, after the evaporation of the solvent, a photochromatic coating.

According to an alternative route, the photochromatic mixture can be added to a polymerizable monomer, e.g., methyl-methacrylate, so that after a polymerization carried out in the presence of a suitable polymerization initiator, e.g., azo-bis(isobutyronitrile), it results to be evenly incorporated to the formed resin.

According to an alternative route, the photochromatic mixture can be dissolved in a suitable solvent, in the presence of a resin, as above disclosed, and from this solution, by evaporating the solvent, a photochromatic film or sheet can be formed, which contain the uniformly dispersed photochromatic mixture.

According to an alternative route, the photochromatic mixture can be applied to a transparent substrate (e.g., a polycarbonate substrate, a polymethylmethacrylate substrate or a poly-diethylene-glycol-bis-(allyl carbonate) substrate) by means of a surface impregnation obtained by placing the substrate into contact, at a suitable temperature, with a solution or dispersion which contains the mixture.

In particular, by means of the above disclosed techniques, photochromatic articles can be obtained, such as photochromatic ophthalmic lenses and photochromatic sun filters, that is to say, which are capable of constituting an at least partial screen towards the sun radiation, in a reversible way.

Such articles can be advantageously used, e.g., as lenses for sun glasses, prescription-lenses, contact lenses, glasses for cars or transport means in general, and windows in the building sector.

The following experimental examples are reported in order to illustrate the present invention without limiting it. The compounds reported in the Examples were prepared according to methods known from the prior art.

In particular, optical photochromatic articles of poly-methyl-methacrylate (PMMA) were obtained by adding the photochromatic compound and the polymerization initiator azo-bis(isobutyro-nitrile) (AIBN) to the monomer and then carrying out the polymerization by casting into moulds of a suitable shape.

Optical articles of poly-diethylene-glycol-bis(allyl-carbonate) were made photochromatic by means of a surface impregnation technique. For that purpose, a solution or suspension is prepared of the photochromatic compound in a suitable solvent or dispersant, normally selected from among the usual organic solvents, silicone oils, fluorinated oils, and the like, and the photochromatic compound is transferred on to the polymeric substrate by dipping the polymeric article in said solution or suspension, for suitable times and at suitable temperatures.

Figure 1:
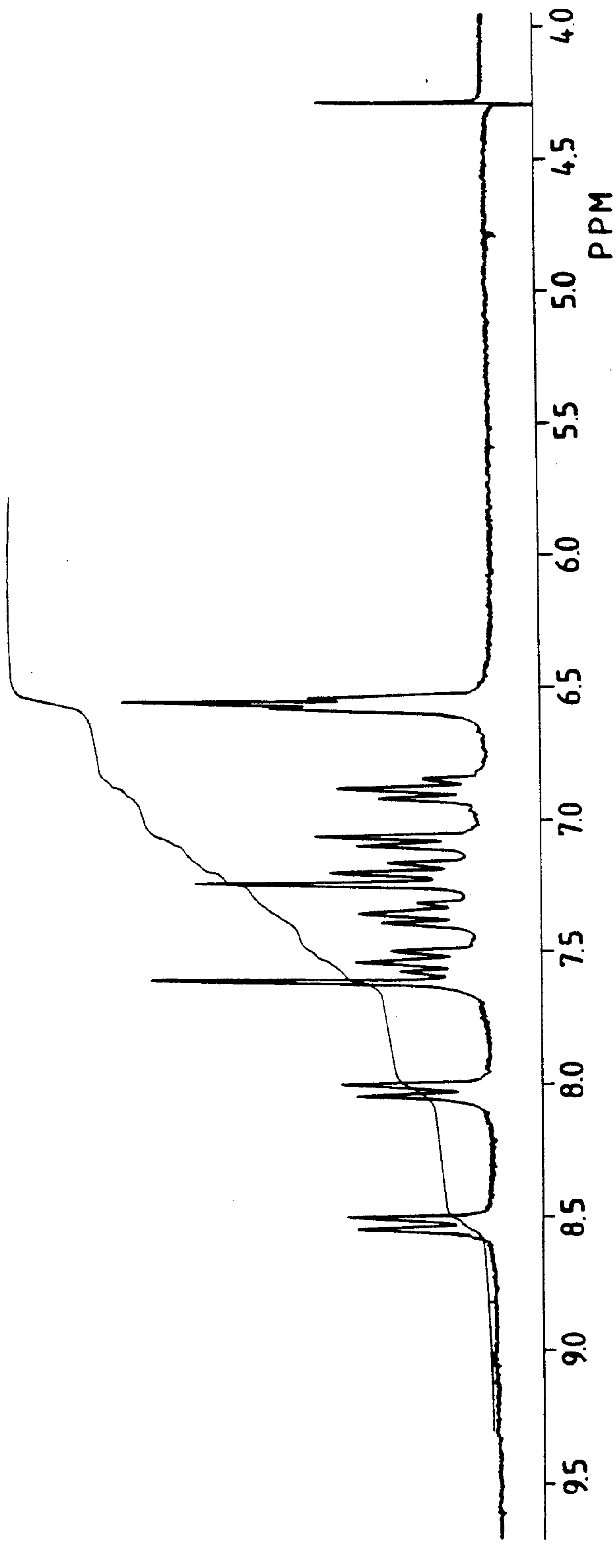
FIGS. 1-5 illustrate the $^1$H NMR spectra of compounds and compositions of the present invention.

A more detailed description of the application processes used is given in the hereinunder reported experimental examples.

On the optical photochromatic articles obtained, the following characteristics are determined:

The U.V.-visible spectrum in the deactivated status (optical density at $\lambda_{max}$), as determined by the Cary 2300 spectrophotometer.

The change in light transmittance ($\Delta Y$) at 23° C., as determined by the MACBETH spectrophotometer, after a 120-second activation with an UV-A lamp of 9 W/m$^2$ of irradiance. The values of $\Delta Y$ were also measured after a 4-minute exposure to sun light, by using the Gardner's Hazemeter XL 211.

Kinetics of return to the deactivated form (time for recovery of 50% of the initial transmittance, $t_{½}$), by means of a MACBETH spectrophotometer, under the same activation conditions as hereinabove disclosed.

Ageing resistance, as determined by means of an Atlas Weather-O-Meter equipped with a continuous-irradiation xenon lamp of 6,500 W, operating at a temperature of 63° C. on the reference black panel, and at a relatively humidity of 50%. The ageing resistance is evaluated by measuring, after various times of exposure in the Weather-O-Meter, the values of optical density at $\lambda_{max}$ of the deactivated form, and the residual value of $\Delta Y$ after activation with the UV-A lamp.

EXAMPLE 1

Photochromatic lenses of poly-diethylene-glycol-bis-(allyl-carbonate) are prepared by means of surface impregnation with mixtures of (A) and (E) photochromatic compounds in the following proportions:

| Photochromatic Mixture | (a) | (b) | (c) |
|---|---|---|---|
| (A) Compound (% by weight) | 20 | 30 | 40 |
| (E) Compound (% by weight) | 80 | 70 | 60 |

In particular, a dispersion of 2% by weight of said (a), (b) or (c) mixture in silicone oil is prepared.

In order to transfer the photochromatic compound, the lens is dipped into the siliconic dispersion for times ranging from 30 to 90 minutes, and at temperatures comprised within the range of from 170° to 190° C., as a function of the desired value for optical density. At the end of the impregnation, the lens is washed with petroleum ester, and the characteristics as listed hereinabove in the specification are evaluated.

The results relevant to the (a), (b) and (c) photochromatic mixtures are reported in Table (I), as compared to those obtained on a lens obtained, under the same conditions, by using the (A) photochromatic compound alone.

TABLE 1

| Photochromatic Compound/ Composition | Optical Density ($\lambda_{max}$) | Optical Status Colour | ΔY (23° C.) | $t_{½}$ (23° C. sec.) |
|---|---|---|---|---|
| (a) Composition | 3.807 (348 nm) | gray-blue | 32.2 | 44 |
| (b) Composition | 3.699 (350 nm) | gray-blue | 36.1 | 50 |
| (c) Composition | 4.116 (350 nm) | gray-violet | 34.9 | 45 |
| (A) Photochromatic Compound | 2.796 (362 nm) | violet | 36.8 | 56 |
| (E) Photochromatic Compound | 2.455 (346 nm) | light blue | 18.7. | 60 |

In Table II, the results obtained from the accelerated ageing tests in W-O-M are reported.

TABLE II

| Photochromatic Compound/ | Exposure in W-O-M (hours) | | | | | |
|---|---|---|---|---|---|---|
| Composition | O.D. | (23° C.) | O.D. | (23° C.) | O.D. | (23° C.) |
| (a) Composition | 3.137 | 29.3 | 2.960 | 28.9 | 2.680 | 25.1 |
| (b) Composition | 3.097 | 32.2 | 2.845 | 32.2 | 2.530 | 26.9 |
| (c) Composition | 3.154 | 32.0 | 2.883 | 34.0 | 2.538 | 26.8 |
| (A) Compound | 1.610 | 33.0 | 0.800 | 21.8 | 0.380 | 9.0 |
| (E) Compound | 1.800 | 18.2 | 1.604 | 18.0 | 1.403 | 18.1 |

From an examination of these results, it is clear that the (a), (b) and (c) mixtures, with the photochromatic activity ($\Delta Y$), and the return times back to the deactivated status ($t_{½}$), being the same, show, as compared to the individual photochromatic (A) and (E) products, the advantages of a colour of the activated status which is more neutral, and can be modulated as a function of their ratio by weight; a considerably higher ageing strength and photochromatic activity then the pure (A) product, and the pure (E) product, respectively.

EXAMPLE 2

The photochromatic response to sun light exposure is evaluated of a neutral lens of poly-diethylene-glycol-bis(allyl carbonate) impregnated with the (b) photochromatic mixture of Example 1, as compared to a similar lens impregnated with the spiro-oxazinic photochromatic compound known from the prior art, having the formula:

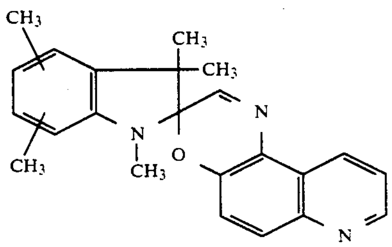

wherein the two methyl groups on the benzene-indolinic ring are in the 4,5- and 5,6-positions.

Both of them were activated by a 4-minute exposure to sun light, and were evaluated for the change in light transmittance (ΔY) shown by the two lenses following said exposure, and measured by means of the Gardner's Hazegard XL 211.

The results are reported in Table III.

TABLE III

| Photochromatic Compound/ Composition | (b) Photochromatic Mixture | Spiro-Oxazine from the Prior Art |
|---|---|---|
| Optical density ($\lambda_{max}$) | 3.482 (350 nm) | 1.792 (347 nm) |
| Activated status colour | gray-blue | blue |
| Deactivated status transmittance (%) | 88 | 90 |
| Activated status transmittance (%) | 45 | 54 |
| ΔY (%), at 23° C. | 43 | 54 |
| $t_{½}$ (23° C., sec.) | 50 | 110 |

As compared to the lens with the spiro-oxazine known from the prior art, the lens obtained with the (b) photochromatic mixture of the present invention shows a more neutral colour of the activated status, a higher photochromatic activity (ΔY), and a twice as high return rate to the deactivated status

EXAMPLE 3

With the (b) photochromatic mixture of the previous example, a neutral photochromatic lens of poly-(methyl-methacrylate) is prepared, which has the following composition:

| | | |
|---|---|---|
| (b) photochromatic mixture | 10 mg | 0.066 parts |
| Methyl-methacrylate | 15 g | 100 parts |
| Azo-bis(isobutyro-nitrile) | 0.15 g | 0.100 parts |

The polymerization of the lens is carried out by casting, maintaining the mould in a temperature-controlled water bath at 55° C. for 80 hours.

At the end of the polymerization, by opening the mould, a photochromatic lens of poly(methyl methacrylate) is obtained, which has the characteristics as reported in Tables IV and V.

In the same tables, also the characteristics are reported for comparison purposes, of lenses obtained, with the other conditions being the same, by separately using the individual (A) and (E) photochromatic compounds.

TABLE IV

| Photochromatic Compound/ Composition | Optical Density ($\lambda_{max}$) | Activated Status Colour | ΔY (23° C.) | $t_{½}$ (23° C. sec.) |
|---|---|---|---|---|
| (b) Composition | 3.490 (349 nm) | gray-blue | 26.0 | 28 |
| (A) Compound | 3.620 (363 nm) | violet | 30.2 | 29 |
| (E) Compound | 3.020 347 nm) | light blue | 4.2 | 11 |

TABLE V

| Photochromatic Compound/ Composition | Exposure in W-O-M (hours) | | | | | |
|---|---|---|---|---|---|---|
| | (O.D.) | ΔY (23° C.) | (O.D.) | ΔY (23° C.) | (O.D.) | ΔY (23° C.) |
| (b) Composition | 3.312 | 20.9 | 3.306 | 19.5 | 3.268 | 17.6 |
| (A) Compound | 3.412 | 27.9 | 3.304 | 26.4 | 3.234 | 24.0 |
| (E) Compound | 2.402 | 3.8 | 1.620 | 3.0 | | |

These results demonstrate that in poly-(methyl methacrylate), the (b) composition according to the present invention unexpectedly shows photochromatic characteristics as well a stability, which are similar t o those of the pure (A) photochromatic compound, even if it is constituted for its major portion by the (E) photochromatic compound, which, in the pure state, displays very bad photochromatic characteristics and ageing resistance.

EXAMPLE 4

A mixture is prepared, which is constituted by a polypropylene powder of MOPLEN FLF 20 type, having a fluidity degree of 11, manufactured by HIMONT, and by the (b) photochromatic mixture of Example 1, in the mutual ratio by weight to each other of respectively 100:0.25.

For comparison purposes, mixtures of polypropylene with the individual (A) and (E) photochromatic com-, pounds in the same weight ratios are prepared.

Said polymeric mixtures are transformed into films of 50 m of thickness by extrusion at the temperature of 215° C. The photochromatic characteristics of the so-obtained films, and the relevant resistances under such conditions as reported in the text, are reported in Table VI.

TABLE VI

| Polypropylene film - Thickness 50 m - Photochromatic product concentration 0.1% | | | | | | | | | |
|---|---|---|---|---|---|---|---|---|---|
| Photochromatic/Compound Composition | 0 (O.D.) | ΔY 23° C. | $t_{1/2}$ seconds | 15 (O.D.) | ΔY 23° C. | $t_{1/2}$ seconds | 30 (O.D.) | ΔY 23° C. | $t_{1/2}$ seconds |
| (b) Composition | 0.124 | 16.3 | 21 | 0.097 | 11.8 | 18 | 0.077 | 3.9 | 29 |
| (A) Compound | 0.169 | 18.4 | 22 | 0 | 0 | / | | | |
| (E) Compound | 0.100 | 4.2 | 10 | 0.08 | 0 | / | | | |

EXAMPLE 5

A mixture of the (D) and (G) photochromatic compounds in the weight ratio of 60/40 is prepared.

Said mixture is applied by surface impregnation to neutral lenses of poly-diethylene-glycol-bis(allyl carbonate), and is evaluated as disclosed at Example 1.

The results are reported in Table VII.

TABLE VII

| | |
|---|---|
| Optical density ($\lambda_{max}$) | 2.944 (345 μm) |
| Colour in the activated status | violet |
| ΔY (23° C.) | 31.7 |
| $t_{1/2}$ (23° C., seconds) | 55 |
| Ageing in W-O-M: | |
| 52 hours, O.D. | 1.728 |
| ΔY (23° C.) | 24.8 |
| 85 hours, O.D. | 1.450 |
| ΔY (23° C.) | 19.2 |
| 158 hours, O.D. | 1.077 |
| ΔY (23° C.) | 18.1 |

EXAMPLE 6

The following mixtures with a different weight ratio between the photochromatic compounds (A) and (F) are prepared: Photochromatic

| Composition | 1 | 2 | 3 | 4 | 5 |
|---|---|---|---|---|---|
| (A) Compound | 0 | 30 | 50 | 70 | 100 |
| (F) Compound | 100 | 70 | 50 | 30 | 0 |

The mixtures Nos. 1 and 5, are reported for comparative purposes.

Said mixtures were applied to the surface of neutral lenses of poly-diethylene-glycol-bis(allyl carbonate) according to the same technique as reported in Example 1.

The resulting properties are reported in Table VIII.

TABLE VIII

| Composition No. | 1 | 2 | 3 | 4 | 5 |
|---|---|---|---|---|---|
| Optical density ($\lambda_{max}$) | 1.274 | >4.500 | 2.600 | 1.378 | 2.006 |
| Colour of the activated state | light blue | blue-violet | blue-violet | blue-violet | violet |
| ΔY 23° C. | 18.8 | 29.4 | 29.7 | 32.7 | 35.4 |
| $t_{1/2}$, 23° C., seconds | 20 | 32 | 34 | 40 | 42 |

The reported data shows the synergistic effect of the two (A) and (F) products, in that the photochromatic activity of their mixtures is very close to the photochromatic activity displayed by the more active (A) compound alone, and the times of return back to the deactivated form are considerably shorter.

Figure 2:
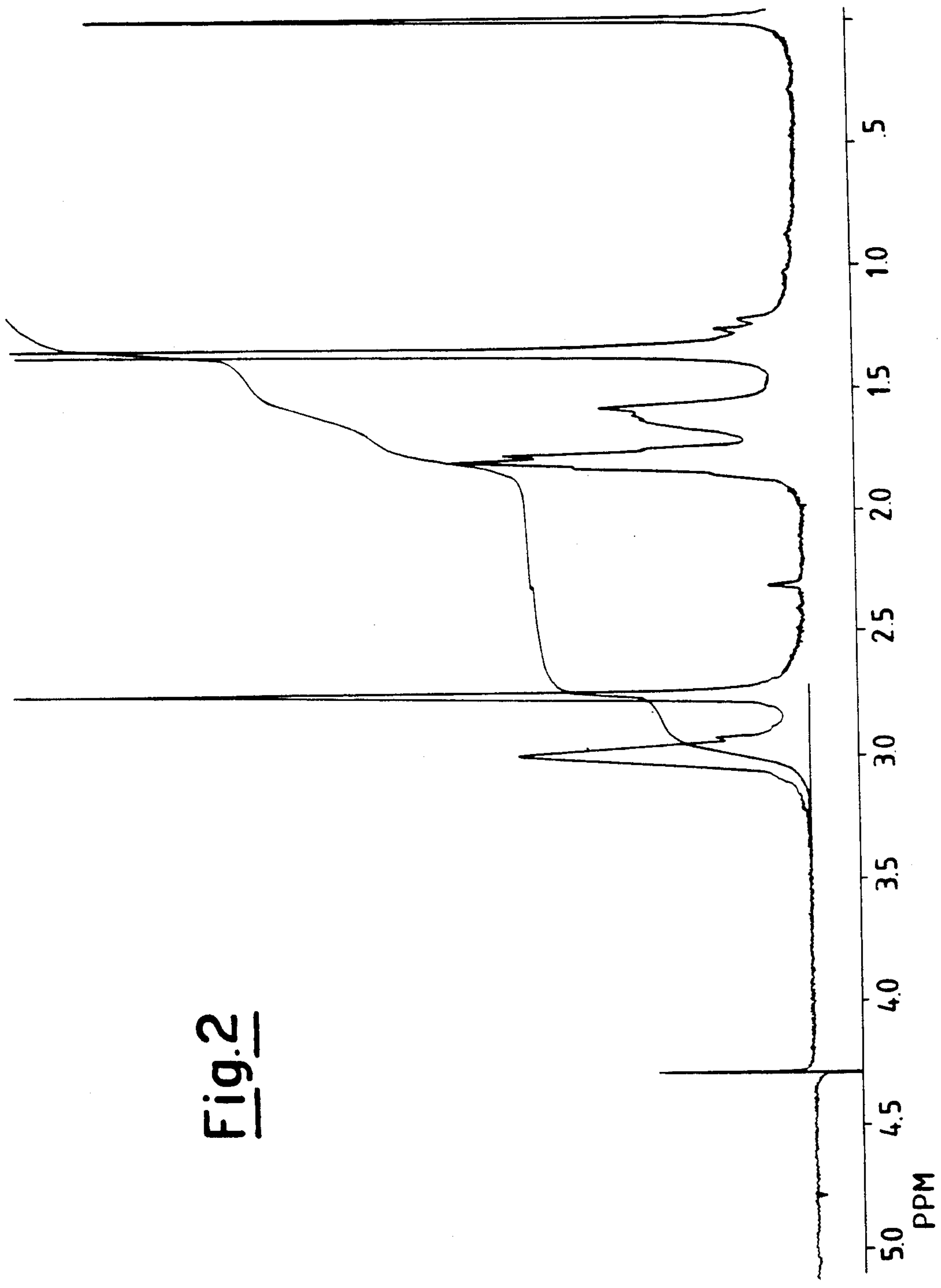
Figure 3:
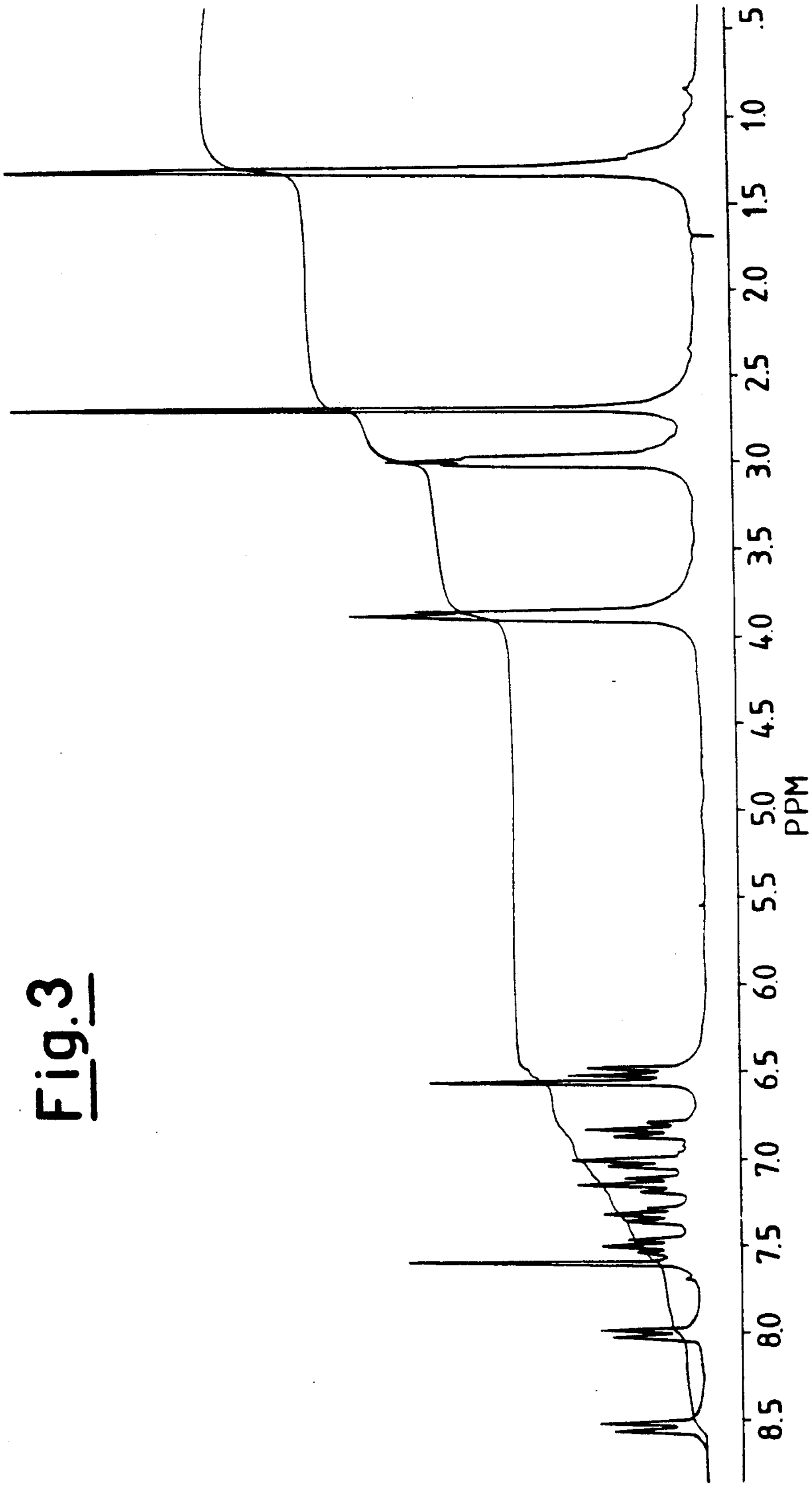
Figure 4:
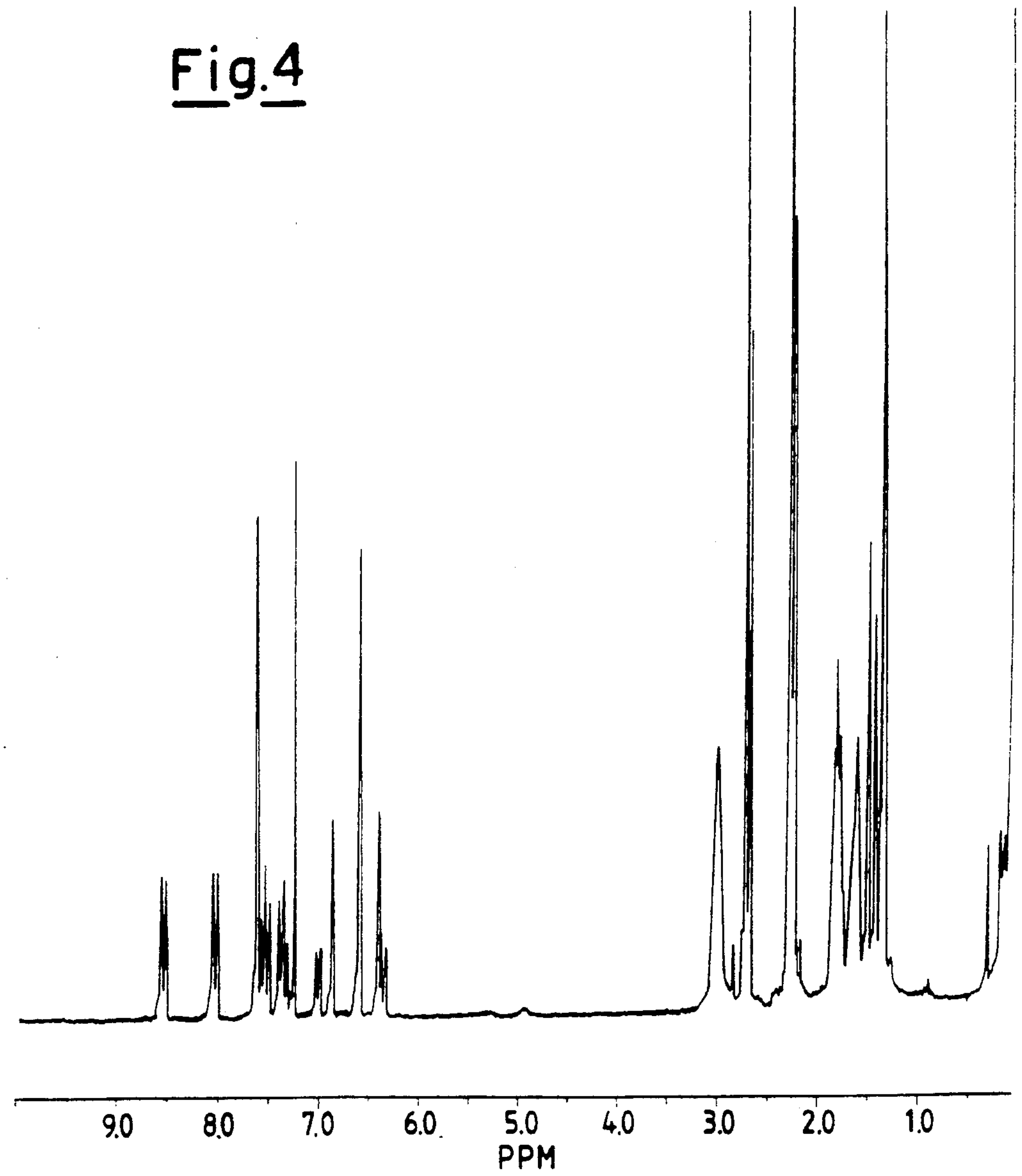
Figure 5:
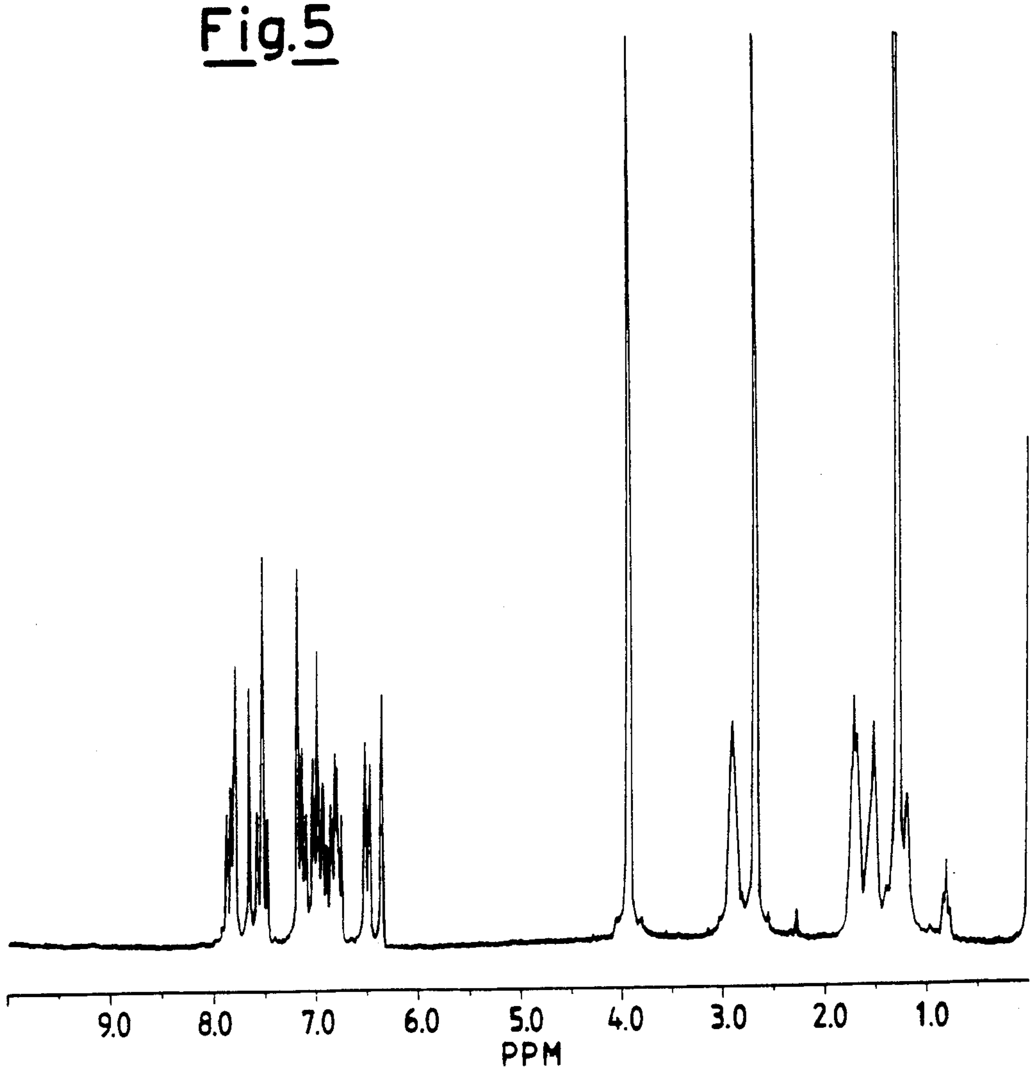

The structures of a few photochromatic compositions of the invention are graphically illustrated in the accompanying drawings, wherein:

FIG. 1 is an NMR$^1$H spectrogram of the photochromatic compound (A) at 10-5 δ;

FIG. 2 is a spectrogram similar to that of FIG. 1, but taken at 5-0 δ;

FIG. 3 is an NMR$^1$H spectrogram of the photochromatic composition (B);

FIG. 4 is an NMR$^1$H spectrogram of the photochromatic composition (C), and FIG. 5 is an NMR$^1$H spectrogram of the photochromatic spectrogram of the photochromatic composition (D).

For all the NMR$^1$ H spectrograms shown in FIGS. 1-5, the substances to be tested were dissolved in deuterated chloroform.

What is claimed is:

1. A photochromatic composition comprising two photochromatic compounds selected from the group consisting of compounds of the formula:

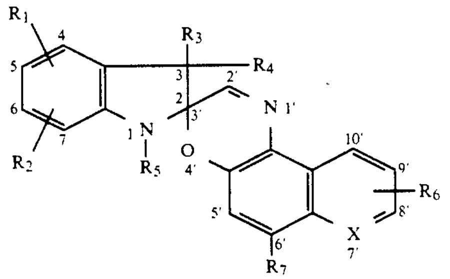

(I)

wherein:

$R_1$ and $R_2$ are independently selected from the group consisting of hydrogen, halogen, $C_1$-$C_5$-alkoxy, nitro, cyano, linear and branched $C_1$-$C_5$-alkyl that are optionally substituted with a substituent selected from the group consisting of halogen, $C_1$-$C_5$-alkoxy, $C_1$-$C_5$-alkyl-thio, $C_1$-$C_5$-alkyl-carboxy, and cyano;

$R_3$ and $R_4$ are independently selected from the group consisting of linear and branched $C_1$-$C_5$ alkyl, phenyl and benzyl, and optionally $R_3$ and $R_4$ form a $C_5$-$C_8$-cycloalkyl group with the carbon atom to which they are commonly linked;

$R_5$ is independently selected from the group consisting of $C_1$-$C_5$ linear and branched alkyl that are optionally substituted with a substituent selected from the group consisting of halogen, $C_1$-$C_5$-alkoxy, $C_1$-$C_5$-alkyl-thio, $C_1$-$C_5$-carboxy-alkyl and cyano group, phenyl, benzyl and allyl;

$R_6$ is independently selected from the group consisting of hydrogen, halogen, $C_1$-$C_5$-alkoxy, $C_1$-$C_5$-alkyl-thio, $C_1$-$C_5$-carboxy-alkyl, cyano, linear and branched $C_1$-$C_5$ alkyl that are optionally substituted with a substituent selected from the group consisting of halogen, $C_1$–$C_5$-alkoxy, $C_1$–$C_5$-alkylthio, $C_1$–$C_5$-carboxy-alkyl and cyano;

$R_7$ represents a hydrogen atom or

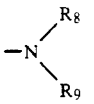

wherein $R_8$ and $R_9$ form a monocyclic or polycyclic structure having from 5 to 12 members with the nitrogen atom to which they are commonly linked, said cyclic structure optionally containing an additional heteroatom selected from the group consisting of oxygen and nitrogen; and X represents a —CH— group or N;

wherein at least one of said photochromatic compounds defined by formula (I) in said photochromatic composition has an $R_7$ substituent which is hydrogen and at least one of said photochromatic compounds defined by formula (I) has an $R_7$ substituent wherein $R_8$ and $R_9$ in the group

are as defined herein above.

2. The photochromatic composition of claim 1 which comprises at least one of said photochromatic compounds of formula (I), wherein:

$R_1$ and $R_2$ independently represent a hydrogen atom;

$R_3$ and $R_4$ each represent a methyl group with the carbon atom to which they are commonly linked;

$R_5$ represents a methol group;

$R_6$ represents a hydrogen atom;

$R_7$ represents

wherein;

$R_8$ and $R_9$ form a piperidino, with the nitrogen atom to which they commonly are linked; and X represents —CH—;

and at least one of said other photochromatic compounds of formula (I), wherein;

$R_1$ and $R_2$ independently a hydrogen atom or methyl group;

$R_3$ and $R_4$ each represent a methyl group with the carbon atom to which they are commonly linked;

$R_5$ represents a methyl group;

$R_6$ represents a hydrogen atom or methoxy group;

$R_7$ represents a hydrogen atoms; and

X represents —CH—.

3. The photochromatic composition of claim 2, wherein the mole ratio, of said photochromatic compounds of general formula (I) having $R_7$ represent

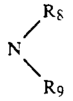

to said photochromatic compound of general formula (I) having $R_7$ representing a hydrogen atom, is from about 0.1 to about 9.

4. The photochromatic composition of claim 3, wherein the mole ratio, of said photochromatic compounds of general formula (I) having $R_7$ representing

to said photochromatic compound of general formula (I) having $R_7$ representing a hydrogen atom, is from about 0.2 to about 1.5.

5. The photochromatic composition of claims 1, 2, 3 or 4, wherein said composition contains 1,3,3-trimethyl-6′-piperidino-spiro-(indolino-2,3′-(3H)-naphtho(2,1-b)-(1,4)-oxazine), and 1,3,3,4,5-pentamethyl-spiro-(indolino-2,3′-(3H)-naphtho-(2,1-b)-(1,4)-oxazine).

6. The photochromatic composition of claims 1, 2, 3 or 4, wherein said composition contains 1,3,3-trimethyl-6′-piperidino-spiro-(indolino-2,3′-(3H)-naphtho(2,1-b)-(1,4)-oxazine), and 1,3,3,5,6-pentamethyl-spiro-(indolino-2,3′-(3H)-naphtho-(2,1-b)-(1,4)-oxazine).

7. The photochromatic composition of claims 1, 2, 3 or 4, wherein said composition contains 1,3,3-trimethyl-6′-piperidino-spiro-(indolino-2,3′-(3H)-naphtho(2,1-b)-(1,4)-oxazine), and 1,3,3,-trimethyl-spiro-(indolino-2,3′-(3H)-naphtho-(2,1-b)-(1,4)-oxazine).

8. The photochromatic composition of claims 1, 2, 3 or 4, wherein said composition contains 1,3,3-trimethyl-6′-piperidino-9′-methoxy-spiro-(indolino-2,3′-(3H)-naphtho(2,1-b)-(1,4)oxazine) and 1,3,3-trimethyl-9′-methoxy-spiro-(indolino-2,3′-(3H)-naphtho-(2,1-b)-(1,4)-oxazine).

9. The photochromatic composition of claims 1, 2, 3 or 4 wherein said composition contains at least one U.V. stabilizer.

10. The photochromatic composition of claim 5, wherein said composition contains photochromatic compounds at a mole ratio of 0.2–1.5 and at least one U.V. stabilizer.

11. The photochromatic composition of claim 6, wherein said composition contains photochromatic compounds at a mole ration of 0.2–1.5 and at least one U.V. stabilizer.

12. The photochromatic composition of claim 7, wherein said composition contains photochromatic compounds at a mole ratio of 0.2–1.5 and at least one U.V. stabilizer.

13. The photochromatic composition of claims 1, 2, 3 or 4, wherein said composition contains a hindered amine U.V. stabilizer.

* * * * *